United States Patent [19]
Lamons et al.

[11] 3,952,937
[45] Apr. 27, 1976

[54] METHOD AND APPARATUS FOR ULTRASONICALLY WELDING CONTINUOUS LENGTHS OF METAL STRIP

[75] Inventors: Robert P. Lamons, Hinsdale, Ill.; James Byron Jones, West Chester, Pa.

[73] Assignee: Andrew Corporation, Orland Park, Ill.

[22] Filed: Nov. 11, 1974

[21] Appl. No.: 522,470

[52] U.S. Cl. .................................. 228/110; 228/1; 228/147
[51] Int. Cl.[2] .......................................... B23K 1/06
[58] Field of Search .............. 228/1, 3, 49, 47, 110, 228/111, 146, 147; 29/470.1, 477, 477.7

[56] References Cited
UNITED STATES PATENTS
3,360,850   1/1968   Avila ................................ 29/470.1

*Primary Examiner*—Al Lawrence Smith
*Assistant Examiner*—Margaret Joyce
*Attorney, Agent, or Firm*—Wolfe, Hubbard, Leydig, Voit & Osann, Ltd.

[57] ABSTRACT

A method and apparatus for ultrasonically welding the overlapped portions of a continuous metal strip that has been rolled about a longitudinal axis to form a tubular product. The metal strip is rolled around the outer surface of an internal mandrel by means of one or more forming tools disposed around the mandrel. At the exit end of the forming tool, a stationary, rigid, non-resonant anvil is formed by a portion of the outer surface of the mandrel so that the anvil is located inside the rolled metal strip and supported by that portion of the mandrel which extends outwardly between the longitudinal edges of the strip upstream of the point where the strip edges are brought together. As the rolled metal strip is advanced, the longitudinal edges thereof are overlapped and passed over the anvil. The outermost surface of the overlapped edge portions is engaged with a non-traversing ultrasonic welding disc which presses the overlapped edge portions against the anvil while vibrating at an ultrasonic frequency in a direction transverse to the direction of advancement of the rolled metal strip. The supporting surface of the anvil is preferably relieved in a pattern that is oriented in the direction of movement of the strip, such as by machining the anvil surface to form a series of parallel, machine direction grooves to minimize friction between the strip and the anvil in the machine direction while providing a large amount of friction between the strip and the anvil in the direction of vibration of the welding disc. The welding disc is continuously rotated with the working peripheral surface of the disc moving in the direction of advancement of the metal strip and substantially the same velocity so as to avoid any friction between the strip and the disc in the machine direction.

11 Claims, 11 Drawing Figures

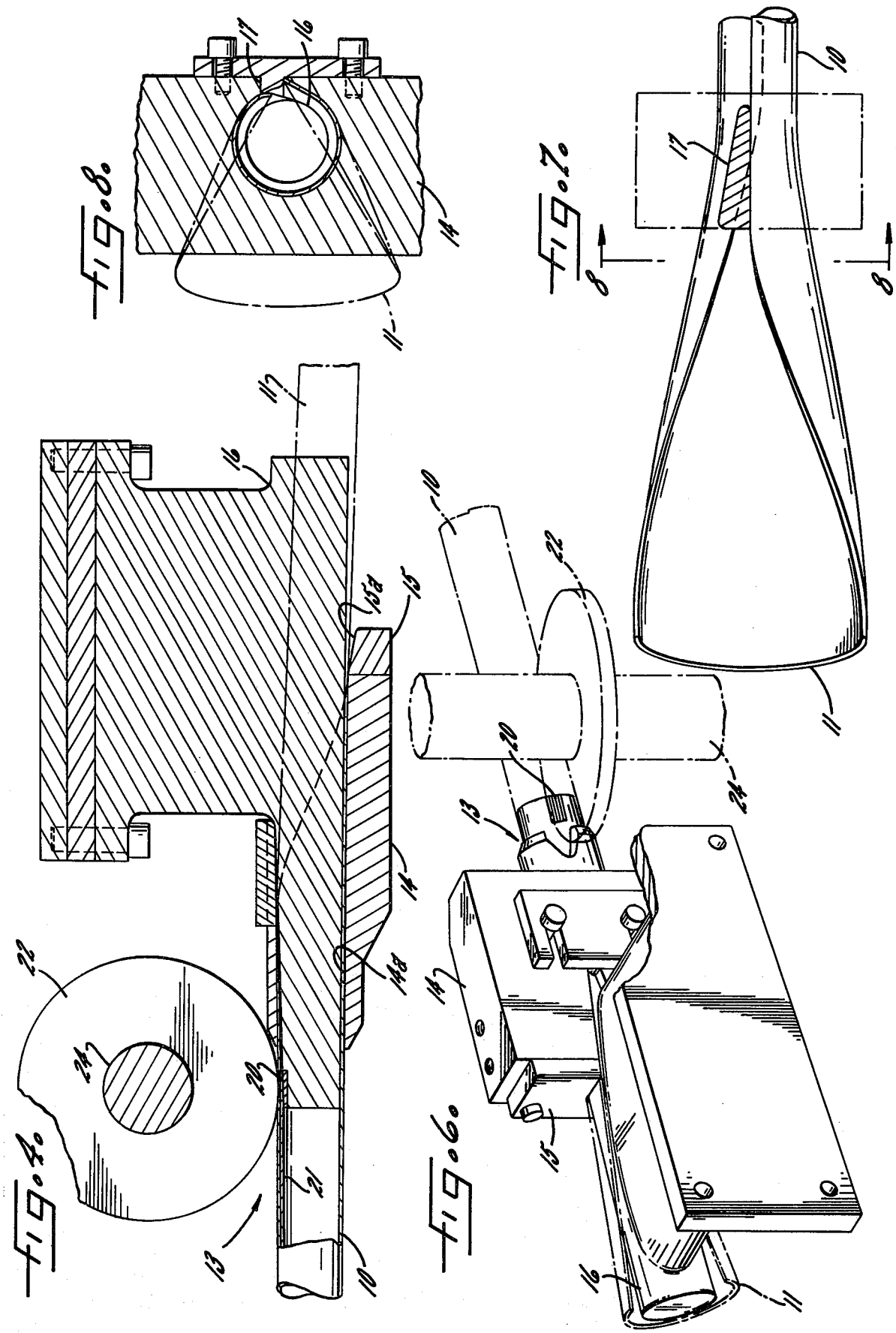

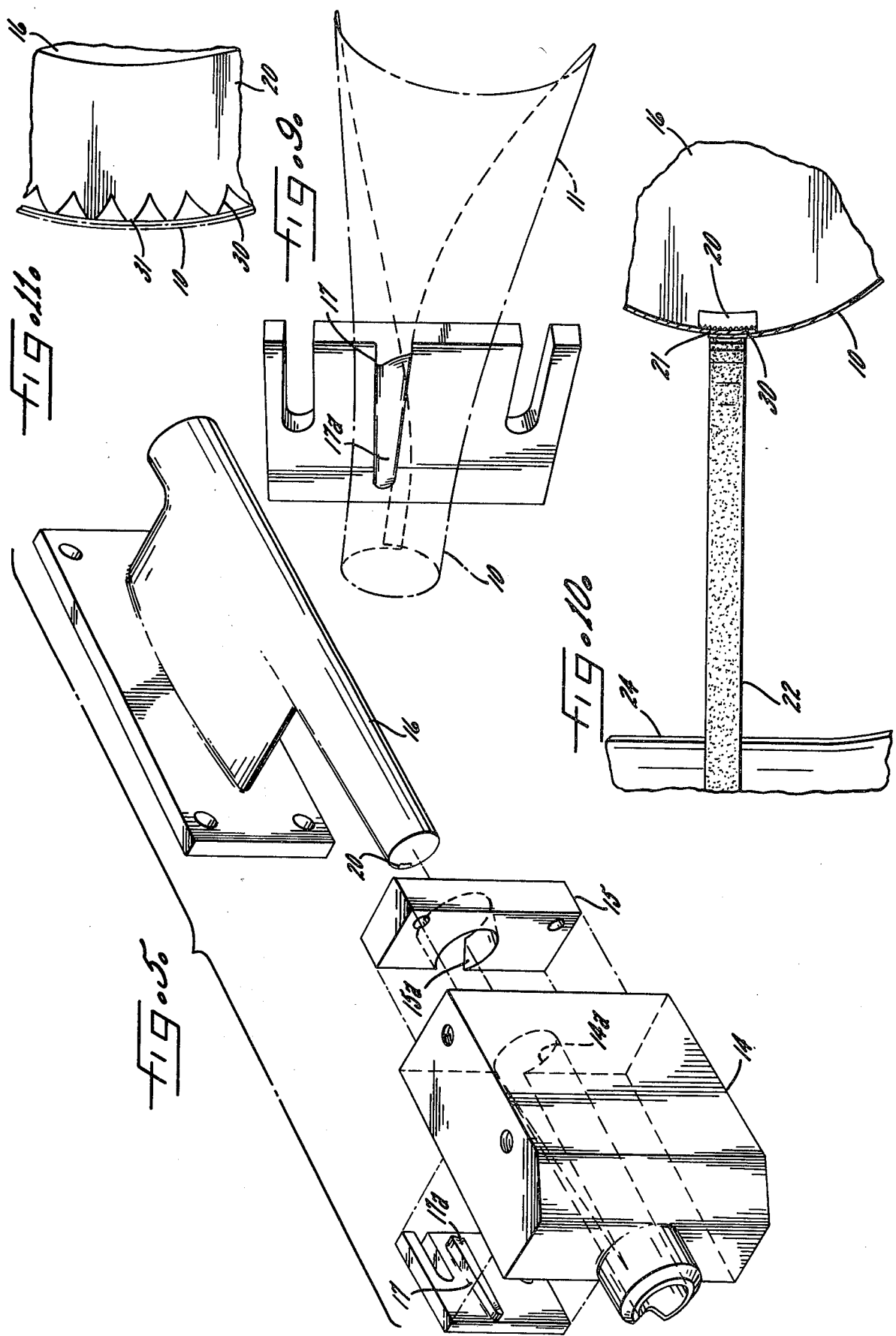

METHOD AND APPARATUS FOR ULTRASONICALLY WELDING CONTINUOUS LENGTHS OF METAL STRIP

DESCRIPTION OF THE INVENTION

The present invention relates generally to the production of continuous tubing and, more particularly, to an improved method and apparatus for ultrasonically welding the longitudinal edge portions of continuous metal strip that has been rolled about a longitudinal axis to form a tubular product.

A wide variety of different ultrasonic welding systems have been used or proposed heretofore for an equally wide variety of different applications. For continuous-seam welding, the ultrasonic systems that have been previously used or proposed include systems in which either the welding head or the workpiece bed or anvil is traversed, thereby requiring relatively complex and costly traversing systems. Another ultrasonic system used heretofore for continuous seam welding is a "roller-roller" system in which the workpiece is drawn between a rotating disc and a counter-rotating anvil, but this system is not practical for use in forming small diameter closed tubes. These prior art ultrasonic welding systems are described in more detail in the *Welding Handbook*, Chapter 49 (1965, American Welding Society).

It has also been proposed, in U.S. Pat. No. 3,360,850 to Avila, to ultrasonically weld continuous seams in small diameter tubing by the use of a resonant, acoustically tuned anvil extending inside the tube. However, the size, mass and geometry of such an anvil are dictated by the frequency to which the anvil is to be tuned, thereby greatly restricting the flexibility that is available in the design of welding equipment that utilizes a rigid, non-resonant anvil.

It is, therefore, a principal object of the present invention to provide an improved method and apparatus for producing continuous tubing by ultrasonic welding of continuous metal strip that has been rolled into a tube of relatively small diameter.

It is another object of the invention to provide an improved ultrasonic welding method and apparatus of the foregoing type in which the welding equipment occupies only a small space along the inner surface of the tube so that other elements to be contained within the final tubular product can be disposed within the tube while it is being formed. In this connection, a more specific object of the invention is to provide such an improved method and apparatus that is especially useful in the production of continuous lengths of coaxial cable and other coaxial products.

A more particular object of the invention is to provide an improved ultrasonic welding method and apparatus of the type described above that do not require any moving parts on the inside surface of the tube being formed.

A further object of the invention is to provide such an improved ultrasonic welding method and apparatus that are economical to operate and which are capable of relatively high production speeds.

A still further object of the invention is to provide such an improved method and apparatus that provide a high degree of reliability in continuous production lines, and which produce a highly uniform product over extended operating periods.

Other objects and advantages of the invention will be apparent from the following detailed description taken with the accompanying drawings, in which:

FIG. 4 is an enlarged section taken along line 4—4 in FIG. 3;

FIG. 5 is an enlarged perspective view of the apparatus shown in FIGS. 2-4, excluding the supporting frame and mounting elements;

FIG. 6 is an enlarged perspective view of the same parts shown in FIG. 5 in their assembled positions, and taken from the rear side of the apparatus as shown in FIG. 5;

FIG. 7 is an enlarged vertical section taken through the tucking tool in the apparatus of FIGS. 1-6, showing this tool acting on the metal strip that is being welded;

FIG. 8 is a section taken along line 8—8 in FIG. 7;

FIG. 9 is a perspective view of the tucking tool shown in FIGS. 7 and 8, with the metal strip acted upon by the tucking tool shown in phantom;

FIG. 10 is an enlarged view of the welding tools in the apparatus of FIGS. 1-6, with the material being welded shown in section; and FIG. 11 is a greatly enlarged fragmentary elevation of the surface of the welding anvil shown in FIG. 10.

Figure 1:
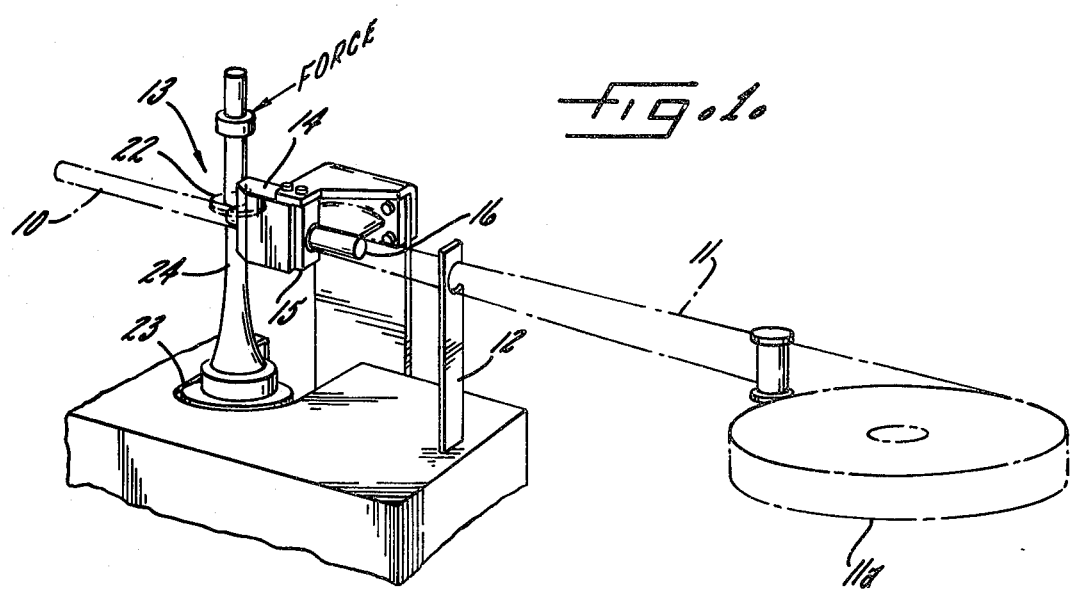
FIG. 1 is a perspectivee view of a method and apparatus embodying this invention for producing small diameter tubing.
Figure 2:
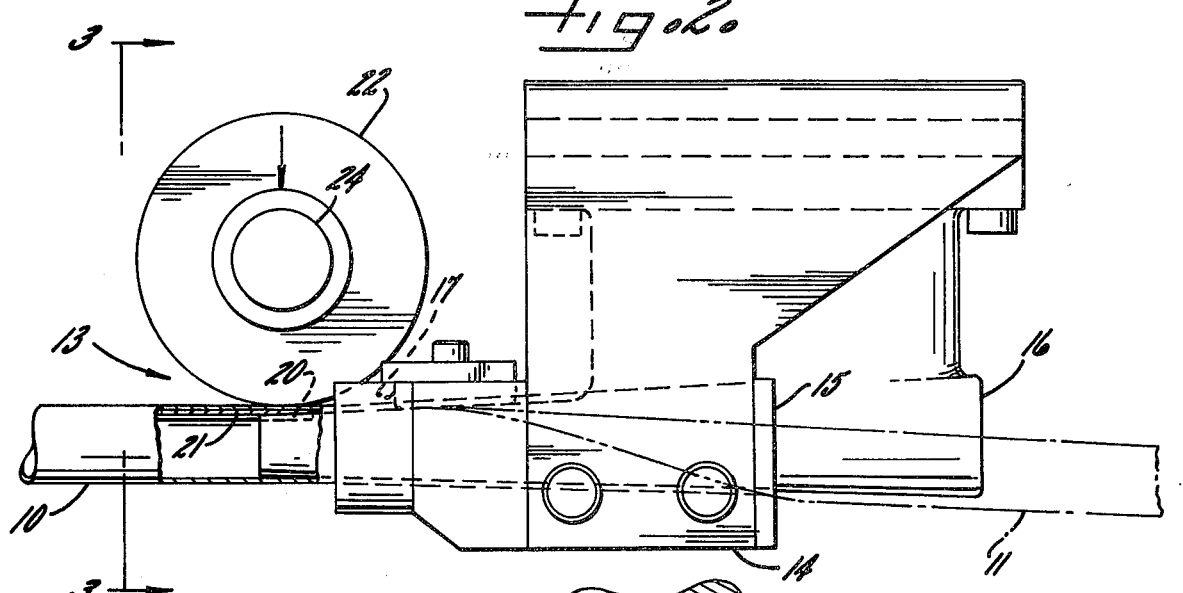
FIG. 2 is an enlarged top plan view of the welding station in the method and apparatus of FIG. 1.
Figure 3:
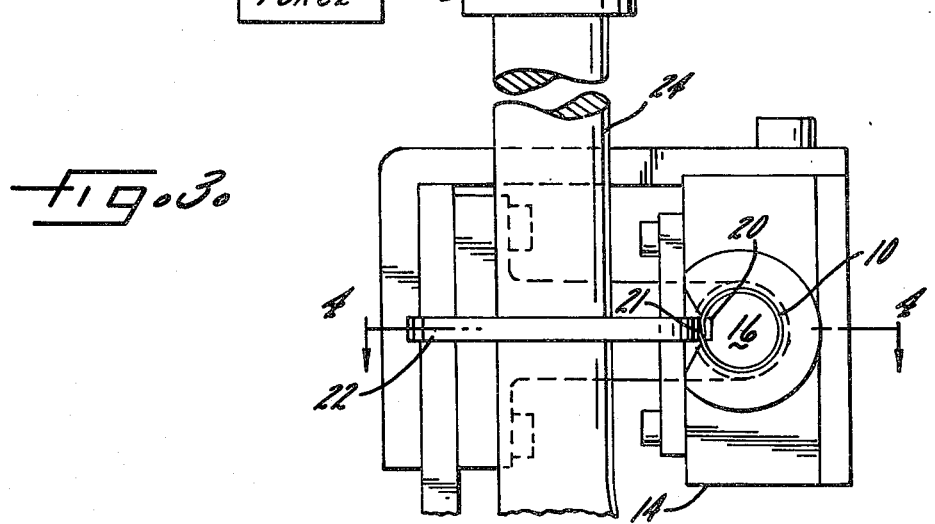
FIG. 3 is a view taken along line 3—3 in FIG. 2.

While the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the invention is to cover all modifications, alternative constructions, and equivalents falling within the spirit and scope of the invention.

Turning now to the drawings and referring first to FIG. 1, there is shown a method and apparatus for producing continuous lengths of tubing 10 from a flat metal strip 11 supplied from a coil 11a. The metal strip 11 is drawn through a preforming tool 12 which curls the strip 11 into an open annulus so that the strip forms a generally C-shaped cross-section. As the curled strip 11 approaches the welding station 13, it enters a forming die 14 through an entry plate 15 to complete the forming of the strip 11 into a continuous tubular configuration.

More particularly, the entry plate 15 forms a tapered bore 15a which continues the curling of the strip 11 and guides it into a longer and more gradually tapered bore 14a in the die 14. As the strip 11 advances through the die 14, it is converted from an open annulus to a closed annulus by the action of the walls of the bore 14a rolling the curled strip into a closed tube. As can be seen most clearly in FIGS. 4 and 5, the bores of the entry plate 15 and the die 14 are formed concentrically around a mandrel 16 which prevents the edges of the strip 11 from turning in as it is rolled into a tube, and ensuring the formation of a smooth closed tube. The strip edges are brought closer and closer to each other as the strip 11 traverses the mandrel 16, and the diameter of the forward portion of the mandrel decreases in the direction of strip movement to conform with the narrowing space between the strip edges (FIGS. 5 and 6).

In order to overlap the edges of the strip 11 as they are brought together within the die 14, a small tucking tool 17 is mounted on the side of the die 14 with the working surface 17a of the tool 17 extending into the bore 14a through the side opening of the bore (FIGS. 5 and 6–9). As the edges of the strip 11 approach each other during the rolling of the strip by the die 14, the curved surface 17a of the tool 17 engages the upper edge and forces it radially inwardly past the lower edge as the rolling of the strip 11 continues. The lower edge of the strip merely rides along the underside of the tool 17 remaining radially outwardly of the upper edge of the strip. Consequently, when the formation of the tube 10 is completed within the die 14, the strip edges overlap each other slightly with the upper edge lying under the lower edge (see FIGS. 7–9).

In accordance with one important aspect of the invention, the lapped edge portions of the rolled metal strip 11 are joined to each other by supporting the longitudinal edge portions of the strip with a statonary, rigid, non-resonant anvil located inside the rolled metal strip and supported by means extending between the longitudinal edges of the strip upstream of the point where those edges are brought together, and continuously engaging the outermost surface of the overlapped edge portions with a non-traversing ultrasonic welding head which presses the overlapped portions of the strip against the anvil while vibrating at an ultrasonic frequency in a direction transverse to the direction of advancement of the rolled metal strip. Thus, in the illustrative embodiment the lapped edge portions of the strip 11 are ultrasonically welded at the exit end of the die 14 with a portion of the outer surface of the mandrel 16 forming an anvil 20 for the welding operation. Since the anvil 20 is formed as a part of the same surface that supports the inside surface of the metal strip 11 during the rolling thereof, it necessarily has substantially the same radius of curvature as the engaged surface of the rolled metal strip.

It will be appreciated that the invention is particularly useful in the formation of small diameter tubing because the anvil can be easily supported inside the tubing. Thus, in the illustrative apparatus the anvil 20 is supported by the internal mandrel 16 which in turn is supported by a lateral extension 16a passing through side openings in the bores 14a and 15a, between the longitudinal edges of the strip 11 before they are brought together, for attachment to a suitable mounting frame (not shown).

A continuous welded seam 21 is formed between the lapped edges of the strip 11 as they pass between the anvil 20 and an ultrasonic welding tool in the form of a horizontal disc 22 having its axis substantially perpendicular to the overlapped longitudinal edges to be welded. To effect the ultrasonic weld, the disc 22 is oscillated in the direction of its axis at an extremely high frequency, typically on the order of 15,000 Hz, by a conventional ultrasonic transducer 23 connected to the disc 22 by a coupler 24. The disc 22 is resonant at the frequency of the transducer to provide amplification of the oscillatory movement at the periphery of the disc with respect to the driving point at the center, and the coupler 24 extends beyond the disc 22 where a force F is applied to the coupler at a one-quarter wave point (a true acoustical node) to increase the force of the disc 22 against the workpiece and to stabilize the entire welding head. In other words, the disc 22 is oscillated in a direction transverse to the direction of movement of the material being welded, i.e., the rolled strip 11. To minimize friction between the strip 11 and the disc 22 in the direction in which the strip 11 is moving, the disc is rotated at a peripheral speed equal to the speed of advancement of the strip 11, thereby providing a zero velocity differential between the engaging surfaces of the strip 11 and the disc 22.

Ultrasonic welding discs and transducers of the type illustrated are commercially available, such as the Model GS-1500-AW-01 Frequency Converter and WS-1500-AS-01 Welding Head made and sold by Sonobond Corporation of Westchester, Pennsylvania. The term "ultrasonic" welding generally refers to welding effected by vibratory movement of a welding head or tool at a frequency above about 15,000 Hz. The use of ultrasonic welding in the illustrative system offers a number of advantages which contribute to more efficient and more versatile production of the desired product. For example, the ultrasonic welding equipment is relatively insensitive to minor variations in the line speed of the material being welded, permits relatively high production rates, and does not generate large amounts of heat to be controlled and dissipated.

In accordance with another important aspect of the invention, the overlapped portions of the strip that are being welded are supported only along a series of spaced parallel strips extending in the direction of advancement of the metal strip to minimize friction between the strip and the anvil in the machine direction while providing a large amount of friction between the strip and the anvil in the direction of vibration of the welding head. Thus, the surface of the anvil 20 is relieved in a pattern that is oriented in the direction of movement of the strip 11, i.e., transverse to the oscillatory movement of the welding disc 22. This orientation of the anvil surface provides relatively high friction between the workpiece and the anvil in the transverse direction to prevent transverse slippage of the workpiece of the anvil, while minimizing friction in the machine direction to maintain smooth, uninterrupted movement of the strip 11 through the welding station. It has been found that this type of anvil permits the attainment of continuous weld seams which are highly uniform without any wrinkling or buckling of the metal strip 11.

The specific configuration of the anvil surface in the illustrative embodiment of the invention is most clearly shown in FIG. 11. It can be seen that the anvil surface comprises a series of grooves 30 which extend parallel to the direction of movement of the strip 11. These grooves are preferably extremely narrow, e.g., about 0.005 inch. Grooves of this type can be formed in the anvil surface by electric discharge machining, making repeated passes over the anvil surface in the machine direction to form the desired grooves 30. The ridges 31 between adjacent grooves 30 are preferably truncated, as shown in FIG. 11, to form flat lands on the tops of the ridges. It has been found that these truncated ridges are preferred over sharp ridges to achieve the desired transverse friction without abrading the surface of the material being welded.

As can be seen from the foregoing detailed description, this invention provides an improved system for producing continuous tubing by ultrasonic welding of continuous metal strip that has been rolled into a tube of relatively small diameter. The welding equipment occupies only a small space along the inner surface of the tube so that, if desired, other elements to be contained within the final tubular product can be disposed within the tube while it is being formed. In this connection, the system is useful, for example, in the production of continuous lengths of coaxial products such as coaxial cables. No moving parts whatever are required on the inside surface of the tube being formed. Furthermore, this system is economical to operate, is capable of relatively high production speeds, provides a high degree of reliability in continuous production lines, and produces a highly uniform product over extended operating periods.

We claim as our invention:

1. A method of ultrasonically welding the longitudinal edge portions of a continuous metal strip that has been rolled about a longitudinal axis to form a tubular product, said method comprising the steps of
   a. supporting the longitudinal edge portions of said strip with a stationary, rigid, non-resonant anvil located inside the rolled metal strip and supported by means extending between the longitudinal edges of the strip upstream of the point where said edges are brought together,
   b. continuously advancing the rolled metal strip while slightly overlapping the longitudinal edge portions thereof and passing the overlapped edge portions over said anvil, and
   c. continuously engaging the outermost surface of the overlapped edge portions with a non-traversing ultrasonic welding head which presses the overlapped edge portions against said anvil while vibrating at an ultrasonic frequency in a direction transverse to the direction of advancement of the rolled metal strip, said anvil supporting said edge portions along a plurality of spaced parallel strips only, said strips extending in the direction of advancement of the rolled metal strip to minimize friction between the metal strip and the anvil in the machine direction while providing a large amount of friction between the metal strip and the anvil in the direction of vibration of said welding head.

2. An ultrasonic welding method as set forth in claim 1 wherein said supporting parallel strips on the anvil surface are substantially flat to avoid scratching of the inner surface of the rolled metal strip that engages the anvil.

3. An ultrasonic welding method as set forth in claim 1 wherein the supporting surface of the anvil is curved in the transverse direction with substantially the same radius of curvature as the engaged surface of the rolled metal strip.

4. An ultrasonic welding method as set forth in claim 1 wherein said ultrasonic welding head is a disc having its axis substantially perpendicular to the overlapped longitudinal edges to be welded and with the periphery of the disc forming the working surface, said disc being vibrated in the direction of its axis and continuously rotated with the periphery of the disc moving in the direction of advancement of said strip.

5. An ultrasonic welding method as set forth in claim 4 wherein the velocity of the working peripheral surface of said disc is substantially the same as the velocity of the continuously advancing metal strip to avoid any friction between the strip and the disc in the machine direction.

6. Apparatus for ultrasoncially welding the longitudinal edges of a continuous metal strip that has been rolled about a longitudinal axis to form a tubular product, said apparatus comprising the combination of
   a. a stationary, rigid, non-resonant anvil supporting the inside longitudinal edge portions of said strip before such edge portions have been brought together, said anvil being located inside the rolled metal strip and supported by means extending between the longitudinal edge portions of the strip.
   b. means for continuously advancing the rolled metal strip while slightly overlapping the longitudinal edge portions thereof and passing the overlapped edge portions over said anvil, and
   c. a non-traversing ultrasonic welding head for continuously engaging the outermost surface of the overlapped edge portions and pressing the overlapped edge portions against said anvil while vibrating at an ultrasonic frequency in a direction transverse to the direction of advancement of the rolled metal strip, said anvil supporting the metal strip along a plurality of spaced parallel strips only, said strips extending in the direction of advancement of the metal strip to minimize friction between the metal strip and the anvil in the machine direction while providing a large amount of friction between the metal strip and the anvil in the direction of vibration of said welding head.

7. Ultrasonic welding apparatus as set forth in claim 6 wherein said supporting parallel strips on the anvil surface are substantially flat to avoid scratching of the inner surface of the metal strip that engages the anvil.

8. Ultrasonic welding apparatus as set forth in claim 6 wherein the supporting surface of the anvil is curved in the transverse direction with substantially the same radius of curvature as the engaged surface of the rolled metal strip.

9. Ultrasonic welding apparatus as set forth in claim 6 wherein said ultrasonic welding head is a disc having its axis substantially perpendicular to the overlapped longitudinal edge portions to be welded and with the periphery of the disc forming the working surface, means for vibrating said disc in the direction of its axis, means for continuously rotating said disc, and means for controlling the speed of said disc.

10. Ultrasonic welding apparatus as set forth in claim 6 wherein the supporting surface of said anvil is relieved in a pattern that is oriented in the direction of movement of said strip.

11. Ultrasonic welding apparatus as set forth in claim 10 wherein the relieved anvil surface forms a series of parallel machine direction grooves with the ridges between adjacent grooves being truncated to form flat lands providing the desired transverse friction without abrading the surface of the metal strip being welded.

* * * * *